United States Patent
Schroeder et al.

(10) Patent No.: US 11,884,134 B2
(45) Date of Patent: Jan. 30, 2024

(54) COOLING SYSTEM OF A VEHICLE, COMPRISING A COOLANT CIRCUIT WHICH CAN BE OPERATED AS A COOLING CIRCUIT FOR AN AC OPERATION AND AS A HEAT PUMP CIRCUIT FOR A HEATING OPERATION

(71) Applicant: AUDI AG, Ingolstadt (DE)

(72) Inventors: Dirk Schroeder, Manching (DE); Christian Rebinger, Munich (DE); Thomas Anzenberger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 97 days.

(21) Appl. No.: 16/493,899

(22) PCT Filed: Mar. 5, 2018

(86) PCT No.: PCT/EP2018/055262
§ 371 (c)(1),
(2) Date: Sep. 13, 2019

(87) PCT Pub. No.: WO2018/166820
PCT Pub. Date: Sep. 20, 2018

(65) Prior Publication Data
US 2020/0023709 A1 Jan. 23, 2020

(30) Foreign Application Priority Data
Mar. 13, 2017 (DE) .......... 10 2017 204 116

(51) Int. Cl.
B60H 1/00 (2006.01)
B60H 1/32 (2006.01)
(Continued)

(52) U.S. Cl.
CPC ..... *B60H 1/00907* (2013.01); *B60H 1/32281* (2019.05); *F25B 13/00* (2013.01);
(Continued)

(58) Field of Classification Search
CPC ............ B60H 1/00907; B60H 1/32281; B60H 2001/00928; B60H 2001/00949; B60H 2001/00957; F25B 25/005; F25B 13/00
See application file for complete search history.

(56) References Cited

U.S. PATENT DOCUMENTS

| 9,908,383 B2 | 3/2018 | Heyl et al. | |
| 2005/0178523 A1* | 8/2005 | Itoh | B60H 1/00385 165/42 |

(Continued)

FOREIGN PATENT DOCUMENTS

| CN | 102563943 A | 7/2012 |
| CN | 102914099 A | 2/2013 |

(Continued)

OTHER PUBLICATIONS

German Examination Report dated Mar. 19, 2018 in corresponding German Application No. 10 2017 204 116.1; 16 pages.

(Continued)

*Primary Examiner* — Joseph F Trpisovsky
(74) *Attorney, Agent, or Firm* — Maier & Maier, PLLC

(57) ABSTRACT

A cooling system of a vehicle, including a coolant circuit, which can be operated as a cooling circuit for an AC operation and as a heat pump circuit for a heating operation, an evaporator, a coolant compressor, a heat exchanger in the form of a coolant condenser or gas cooler for the coolant circuit or in the form of a heat pump evaporator for the heat pump circuit, a first expansion element which is paired with the evaporator, a second expansion element, the heat pump evaporator function of which is paired with the heat exchanger, and an inner heat exchanger with a high-pressure section and a low-pressure section. The low-pressure section is fluidically connected to the downstream coolant compressor. The high-pressure section of the inner heat exchanger is (Continued)

arranged in a coolant circuit section which connects the second expansion element to the heat exchanger.

18 Claims, 2 Drawing Sheets

(51) Int. Cl.
    *F25B 13/00*     (2006.01)
    *F25B 25/00*     (2006.01)

(52) U.S. Cl.
    CPC .. *F25B 25/005* (2013.01); *B60H 2001/00928* (2013.01); *B60H 2001/00949* (2013.01); *B60H 2001/00957* (2013.01)

(56) References Cited

U.S. PATENT DOCUMENTS

| | | | |
|---|---|---|---|
| 2006/0191280 A1* | 8/2006 | Kurosawa | F25B 9/008 62/324.1 |
| 2009/0211236 A1* | 8/2009 | Schwarzkopf | F01N 13/009 60/320 |
| 2010/0050672 A1* | 3/2010 | Kurihara | F25B 9/008 62/509 |
| 2011/0041527 A1* | 2/2011 | Jakobsen | F25B 9/008 62/468 |
| 2012/0132392 A1* | 5/2012 | Park | B60H 1/00385 165/42 |
| 2012/0318000 A1* | 12/2012 | Schroeder | F25B 1/10 62/510 |
| 2013/0031922 A1* | 2/2013 | Heyl | F25B 41/24 62/190 |
| 2013/0319029 A1* | 12/2013 | Sekiya | B60H 1/00899 62/238.7 |
| 2014/0075972 A1* | 3/2014 | Heyl | B60H 1/00907 62/324.1 |
| 2015/0338134 A1* | 11/2015 | Taniguchi | F25B 13/00 62/160 |
| 2016/0257179 A1* | 9/2016 | Miyakoshi | B60H 1/00921 |
| 2016/0265819 A1* | 9/2016 | Durrani | F25B 25/005 |
| 2017/0008407 A1* | 1/2017 | Porras | B60H 1/00921 |
| 2017/0197488 A1* | 7/2017 | Kim | H01M 10/625 |
| 2017/0267063 A1* | 9/2017 | Shan | B60H 1/32281 |
| 2019/0366800 A1* | 12/2019 | Durrani | B60H 1/004 |
| 2020/0070628 A1* | 3/2020 | Tan | B60H 1/00 |

FOREIGN PATENT DOCUMENTS

| | | | | |
|---|---|---|---|---|
| CN | 103660850 A | | 3/2014 | |
| DE | 69413481 T2 | | 3/1999 | |
| DE | 10158385 A1 | | 6/2003 | |
| DE | 102005007322 A1 | | 12/2005 | |
| DE | 10 2010 054 957 A1 | | 6/2012 | |
| DE | 102011118162 A1 | * | 5/2013 | ............. F25B 41/20 |
| DE | 102011118162 A1 | | 5/2013 | |
| DE | 10 2012 108 731 A1 | | 3/2014 | |
| DE | 102012108731 A1 | | 3/2014 | |
| DE | 10006513 B4 | | 12/2014 | |
| DE | 102013021360 A1 | | 6/2015 | |
| DE | 102013021360 A1 | * | 6/2015 | ............. F25B 49/02 |
| DE | 102015007565 B3 | | 11/2016 | |
| DE | 112013005932 B4 | | 7/2017 | |
| DE | 10 2011 109 505 B4 | | 12/2019 | |
| EP | 1695849 A1 | | 8/2006 | |
| EP | 1456046 B1 | | 7/2008 | |
| JP | 2004-98974 A | | 4/2004 | |
| JP | 3941638 B2 | * | 7/2007 | ............. F25B 41/20 |
| JP | 2012131480 A | | 7/2012 | |
| JP | 2013-047600 A | | 3/2013 | |
| JP | 2014-058305 A | | 4/2014 | |
| JP | 5855617 B2 | | 2/2016 | |
| WO | 2011/029538 A1 | | 3/2011 | |
| WO | WO-2011029538 A1 | * | 3/2011 | ......... B60H 1/00392 |

OTHER PUBLICATIONS

International Search Report and Written Opinion dated Jun. 18, 2018 in corresponding International Application No. PCT/EP2018/055262; 30 pages.
Japanese Office Action dated Jan. 5, 2021, in connection with corresponding JP Application No. 2019-550799 (8 pp., including machine-generated English translation).
English translation of International Preliminary Search Report on Patentability dated Sep. 26, 2019 in corresponding International Application No. PCT/EP2018/055262; 8 pages.
European Examination Report dated Nov. 24, 2020, in connection with corresponding EP Application No. 18 111 497.0 (11 pp., including machine-generated English translation).
Office Action dated Oct. 27, 2020 in corresponding Korean Application No. 10-2019-7029649; 12 pages including English-language translation.
Chinese Office Action, dated Jun. 24, 2022, in corresponding Chinese Patent Application No. 201880017922.X; 15 pages.

\* cited by examiner

COOLING SYSTEM OF A VEHICLE, COMPRISING A COOLANT CIRCUIT WHICH CAN BE OPERATED AS A COOLING CIRCUIT FOR AN AC OPERATION AND AS A HEAT PUMP CIRCUIT FOR A HEATING OPERATION

FIELD

The invention relates to a cooling system of a vehicle, comprising a coolant circuit which can be operated as a cooling circuit for an AC operation and as a heat pump circuit for a heating operation.

BACKGROUND

It is known to configure a coolant circuit of a vehicle air conditioning system both for cooling operation (AC operation) and for heating operation by means of a heat pump function for heating the passenger compartment. In its function as a heat pump, the coolant circuit can heat an air or water flow or cooling medium flow and deliver this heat directly or indirectly to the supply air of the passenger compartment.

In such coolant circuits with or without heat pump function, internal heat exchangers are used as performance and efficiency enhancing measures with which thermal energy is transferred from the high-pressure side of the coolant circuit to its low-pressure side, thereby lowering the temperature of the coolant before it enters an expansion element of the coolant circuit and at the same time raising the temperature prior to entry into the compressor.

In conjunction with the use of an internal heat exchanger, a problematic temperature increase can occur on the low-pressure side upstream of the coolant compressor, and this additional heat input may result in critical operating temperatures of the coolant compressor, particularly hot gas problems, particularly in high load operation. Such temperature increase caused by the internal heat exchanger can also occur in a heat pump mode of a coolant circuit, since significant temperature differences and thus higher temperature gradients may occur between the high-pressure and low-pressure sides.

This problem is not addressed in the generic type of coolant circuit known from DE 100 06 513 B4, although coolant flows through an internal heat exchanger both on the high-pressure side and on the low-pressure side in this known coolant circuit when it is in heat pump mode.

A cooling system having a generic type of coolant circuit for a vehicle is known from EP 1 456 046 B1, which circuit can be operated both as a cooling system in AC operation and in a heat pump mode in heating operation. In heat pump mode, the compressed coolant is supplied to a heating register disposed in an AC device by means of a heat pump pipe section of the coolant circuit to directly heat the air supplied to the vehicle interior. Then the coolant is expanded to an intermediate pressure level via a check valve in a heat exchanger disposed in the AC device by means of an expansion element to transfer the supply air from or to the coolant, particularly to dry the air supplied to the vehicle interior. This heat exchanger is at the same time used as an evaporator for cooling the supply air in AC operation. From the intermediate pressure level, the coolant is expanded in heating operation to a low-pressure level by means of another expansion element while absorbing heat from a heat source, using a coolant-cooling medium heat exchanger. This coolant-cooling medium heat exchanger transfers engine heat from a coolant circuit to the coolant.

This known coolant circuit according to EP 1 456 046 B1 also comprises an internal heat exchanger having a high-pressure section and a low-pressure section. In AC operation, coolant flows through both the high-pressure and low-pressure sections of this internal heat exchanger to transfer residual heat of the coolant from the high-pressure side to the low-pressure side of the coolant circuit. In heat pump operation, coolant flows through the evaporator provided for AC operation and the associated expansion element via the heat pump pipe section. A check valve prevents flow back of coolant into the high-pressure section of the internal heat exchanger.

If ambient air of the vehicle is used as heat source in heat pump operation of this known coolant circuit according to EP 1 456 046 B1, the coolant expanded to intermediate pressure level from the evaporator disposed in the AC device is directly fluidically connected via a pipe section configured with an expansion element to a gas cooler, through which coolant flows in the reverse direction in AC operation to release heat into the environment. A pipe section connecting a collector and the low-pressure section of the internal heat exchanger to the compressor is closed by means of a valve here. This means that there is no coolant flow through the high-pressure section or through the low-pressure section of the internal heat exchanger. In such a known coolant circuit in which the ambient air of the vehicle is used as a heat source for implementing a heat pump, complex piping is required to switch the internal heat exchanger inactive.

DE 101 58 385 A1 describes a coolant circuit, which likewise can be used as a heat pump for a heating operation of the vehicle interior, wherein a medium to be cooled, such as the intake air of an internal combustion engine, is used as heat source. This known coolant circuit also comprises an internal heat exchanger through which coolant flows in heating operation both on the high-pressure side and on the low-pressure side. The low-pressure side of the internal heat exchanger can be short-circuited using a connected bypass line to keep the final compression temperature of the coolant on the high-pressure side of the compressor within admissible limits. This switches the internal heat exchanger inactive, such that no heat is transferred from its high-pressure side to its low-pressure side. But this additional bypass line results in more complex piping to implement such a coolant circuit.

The extra piping effort shown in prior art results in additional system volume and thus in an increased fill quantity requirement of the coolant circuit and, if R744 is used as coolant, comes undesirably close to the 250 g/L specification.

SUMMARY

It is the problem of the disclosure to provide a cooling system having a coolant circuit of the type mentioned at the outset, in which the internal heat exchanger is functionally inactive in the heat pump mode without requiring extra piping, e.g. for bypass lines.

Such a cooling system of a vehicle, having a coolant circuit which can be operated as a cooling circuit for an AC operation and as a heat pump circuit for a heating operation, includes:

an evaporator,
a coolant compressor, a heat exchanger as coolant condenser or gas cooler for
   the coolant circuit or as heat pump evaporator for the
   heat pump circuit,
a first expansion element associated with the evaporator,
a second expansion element associated with the heat
   exchanger when functioning as a heat pump evaporator,
   and
an internal heat exchanger having a high-pressure branch
   and a low-pressure branch, wherein the low-pressure
   branch is fluidically connected to the downstream-side
   coolant compressor.

According to the disclosure, the high-pressure branch of the inner heat exchanger is arranged in a coolant circuit section which connects the second expansion element to the heat exchanger.

In this cooling system according to the disclosure, the internal heat exchanger is inserted into the coolant circuit in such a manner that the original high-pressure section is operated at a low-pressure level in heat pump operation, which corresponds to the low-pressure level in the low-pressure section of the internal heat exchanger. Thus the two flow sectors of the internal heat exchanger are at the same pressure level, that is, at an identical temperature level, as it were, which is why no heat transfer can take place between the two sections of the internal heat exchanger. The internal heat exchanger is thus operated in heat pump operation with an active flow, but in a functionally inactive state. This is achieved, according to this invention, by merely repositioning the expansion element for the heat exchanger used as heat pump evaporator for the air heat pump function, although medium flows through both sections of the internal heat exchanger and without requiring extra piping.

According to a preferred embodiment of the disclosure:
a heat pump pipe section having a heat register can be
   connected to the cooling circuit for forming the heat
   pump circuit and disconnected from the coolant circuit
   for the AC operation via a valve, and
the heat pump pipe section can be fluidically connected
   via the second expansion element to the high-pressure
   section of the internal heat exchanger for performing an
   air heat pump function by means of the heat exchanger.

This heat pump pipe section can be used to implement the air heat pump function using the ambient air as heat source. To this end, the coolant is expanded to low-pressure by means of the second expansion element, both into the high-pressure section of the internal heat exchanger and into the heat exchanger used as heat pump evaporator.

In another advantageous embodiment of the disclosure, the high-pressure section of the internal heat exchanger can be fluidically connected by means of the second expansion element to the series connection of the evaporator and the associated first expansion element for performing the AC operation. To this end, the second expansion element is configured to be controllable, such that medium can flow through it in the flow direction required for AC operation. According to a further developed embodiment, if the respective flow cross section is too small for the AC function, a check valve is connected in parallel to the second expansion element in such a manner that the check valve can be operated in passage mode for AC operation and in blockage mode for heating operation. According to a particularly preferred further developed embodiment of the disclosure, the series connection of the evaporator and the associated first expansion element can be fluidically connected by means of a controllable valve element to a partial section of the coolant circuit section connecting the high-pressure section of the internal heat exchanger to the second expansion element. The advantage of such a coolant circuit is that, if a controllable second expansion element is used and its function and flow cross section permit bidirectional flow-through and pressure/flow losses, no check valve preventing flow back into the heat pump pipe section is required for AC operation.

In another advantageous embodiment of the disclosure for using electric components as heat sources,
at least one coolant-cooling medium heat exchanger with
   a coolant circuit is provided, which comprises at least
   one electric component operated as heat source,
a third expansion element associated with the coolant-
   cooling medium heat exchanger is provided, and
the series connection of the evaporator with the associated
   first expansion element is fluidically connected in par-
   allel with the series connection of the coolant-cooling
   medium heat exchanger with the associated third
   expansion element.

According to another preferred further developed embodiment, the series connection of the coolant-cooling medium heat exchanger with the associated third expansion element can be fluidically connected to the high-pressure section of the internal heat exchanger by means of a controllable valve element.

In this coolant circuit according to the disclosure, both the coolant circuit branch consisting of the first expansion element and the evaporator and the parallel coolant branch consisting of the third expansion element and the coolant-cooling medium heat exchanger, also called chiller, are directly fluidically connected to the partial section of the coolant circuit section connecting the high-pressure section of the internal heat exchanger with the second expansion element, wherein this coolant circuit section connects the heat exchanger used as heat pump evaporator to the second expansion element. This controllable valve element prevents the storage of coolant in the pipe branch of high-pressure section of the internal heat exchanger and the heat exchanger used as heat pump evaporator during heating operation with exclusive use of the chiller for the water heat pump function.

BRIEF DESCRIPTION OF THE DRAWINGS

The invention is described in detail below using exemplary embodiments and with reference to the appended figures. Wherein.

DETAILED DESCRIPTION

Figure 1:
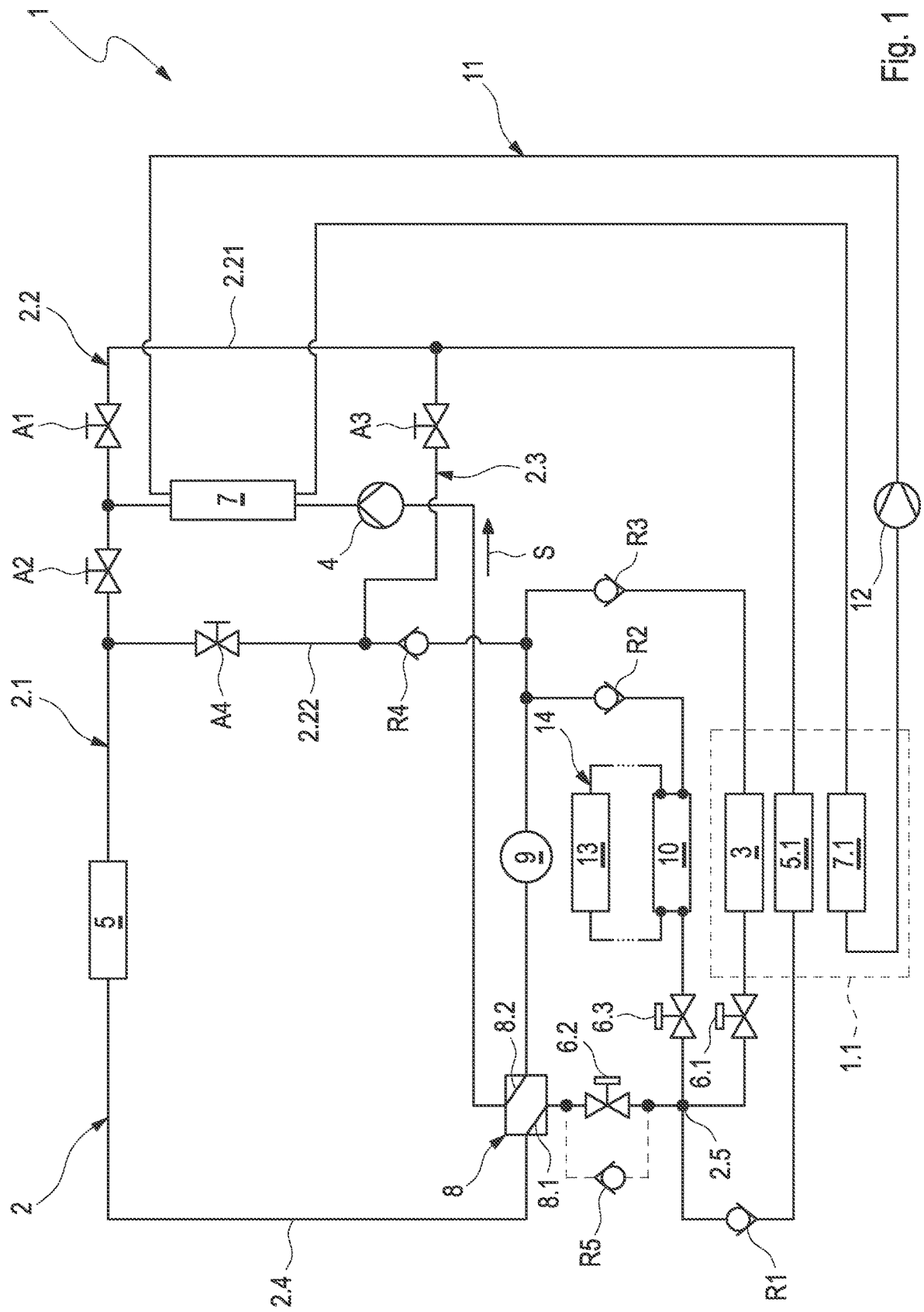
FIG. 1 shows a circuit diagram of a cooling system of a vehicle as an embodiment.
Figure 2:
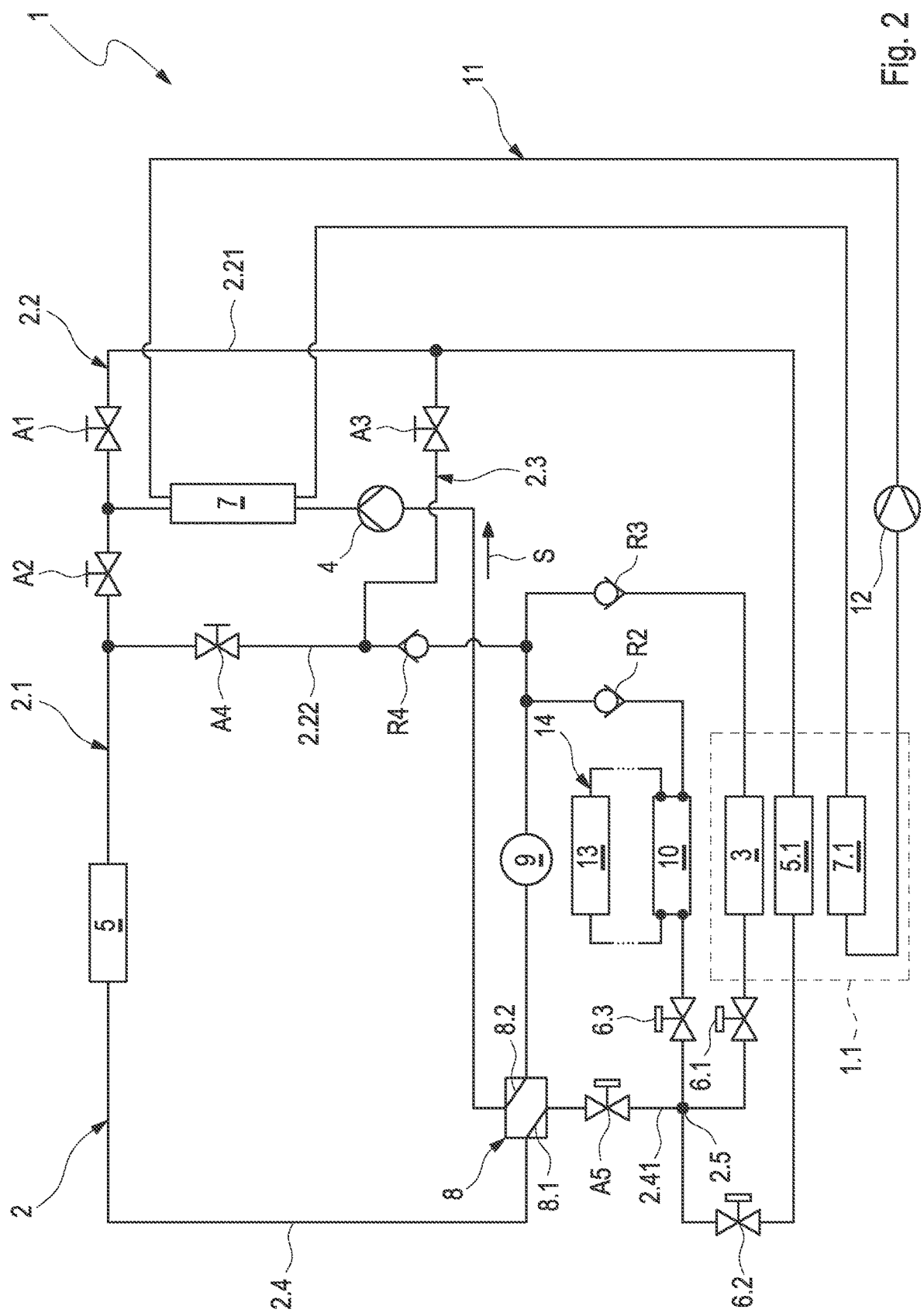
FIG. 2 shows a circuit diagram of another cooling system of a vehicle as another embodiment.

The vehicle cooling systems 1 shown in FIGS. 1 and 2 comprise coolant circuits 2 having a coolant, e.g. carbon dioxide (R744), which have identical basic structures and can be operated both as cooling circuits for an AC operation and as heat pump circuits for a heating function.

For forming a cooling circuit 2.1, each coolant circuit 2 according to FIGS. 1 and 2 consists of the following components, arranged in the flow direction S of the coolant starting from a coolant compressor 4:
   a coolant-cooling medium heat exchanger 7 operating at
      high-pressure, which is thermally connected to a heat-
      ing heat exchanger 7.1 via a coolant circuit 11 in which
      the coolant is circulated by means of a water pump 12,
   a heat exchanger 5 which can be fluidically connected
      with the coolant-cooling medium heat exchanger 7 via a valve element A2 configured as a stop valve and which operates as a coolant condenser or gas cooler in the AC operation of the vehicle cooling system 1 and assumes the function of a heat pump evaporator in heat pump operation, an internal heat exchanger 8 having a high-pressure section 8.1 and a low-pressure section 8.2, an evaporator 3 having a first expansion element 6.1 configured as an expansion valve with stop function, wherein the series connection of the first expansion element 6.1 and the evaporator 3 is fluidically connected via a branching point 2.5 of the coolant circuit 2 with the high-pressure section 8.1 by means of a second expansion element 6.2 configured as an expansion valve with stop function according to FIG. 1, and with the high-pressure section 8.1 by means of a controllable valve element A5 according to FIG. 2, and a check valve R3 downstream of the evaporator 3, which valve conducts the coolant from the evaporator 3 via a coolant collector 9 and the low-pressure section 8.2 of the internal heat exchanger 8 to the intake side of the coolant compressor 4.

The cooling circuit 2.1 according to FIGS. 1 and 2 further includes a coolant-cooling medium heat exchanger 10 operating at low-pressure level, a third expansion element 6.3 configured as an expansion valve with stop function being disposed upstream thereof in the flow direction S of the coolant, and a check valve R2 being disposed downstream thereof. This series connection of the third expansion element 6.3, the coolant-cooling medium heat exchanger 10, and the check valve R2 is fluidically connected, on the one hand, to the branching point 2.5 and on the other hand to the coolant collector 9. This coolant-cooling medium heat exchanger 10 is thermally coupled with a coolant circuit 14 comprising a heat source 13 to cool this heat source 13 as a so-called chiller using water as coolant. A traction component (electric drive motor, high-voltage battery, charging electronics) of the vehicle configured as a hybrid or electric vehicle is used as heat source 13.

A heat pump pipe section 2.21 is fluidically connected via a valve element A1 configured as a stop valve to the cooling circuit 2.1 of the vehicle cooling system 1 to form a heat pump circuit 2.2 for the heating operation of the coolant circuit 2. A heat register 5.1, which is fluidically connected to the branching point 2.5 of the coolant circuit 2 in the flow direction S according to FIG. 1 via a check valve R1, is disposed on the downstream side of this heat pump pipe section 2.21. According to FIG. 2, said heat register 5.1 is fluidically connected on the downstream side to the branching point 2.5 of the coolant circuit 2 via a second expansion element 6.2 configured as an expansion valve with stop function.

According to FIGS. 1 and 2, the evaporator 3, the heat exchanger 7.1, and the heat register 5.1 are jointly housed in an air conditioning device 1.1 of the vehicle cooling system 1.

The difference between the coolant circuits 2 according to FIGS. 1 and 2 is the arrangement of the second expansion element 6.2 in the cooling circuit 2.1 or in the heat pump circuit 2.2.

This second expansion element 6.2 is used to expand the coolant to low-pressure level into the heat exchanger 5 used as heat pump evaporator in heat pump operation. To operate the internal heat exchanger 8 functionally inactively in this heat pump mode in which the ambient air of the vehicle is used as heat source by means of the heat exchanger 5, the high-pressure section 8.1 of said internal heat exchanger 8, according to FIG. 1, is disposed in a coolant circuit section 2.4 connecting the second expansion element 6.2 to the heat exchanger 5 in such a manner that the second expansion element 6.2 establishes a fluidic connection between the high-pressure section 8.1 of the internal heat exchanger 8 and the branching point 2.5 of the coolant circuit 2. Thus the coolant in this high-pressure section 8.1 is likewise expanded to a low-pressure level, which substantially matches the low-pressure level in the low-pressure section 8.2 of the internal heat exchanger 8. This largely prevents a heat input from the high-pressure section 8.1 to the low-pressure section 8.2. Equal pressure in this operating case corresponds to equal temperatures of the media in the two pipe sections 8.1 and 8.2 of the internal heat exchanger 8.

In addition to this air heat pump implemented using the heat exchanger 5, the heat source 13 of the chiller 10 can also be used for a water heat pump. This water heat pump can be implemented instead of, or in addition to, said air heat pump.

According to FIG. 2, the high-pressure section 8.1 of the internal heat exchanger 8 is also disposed in a coolant circuit section 2.4 connecting the second expansion element 6.2 to the heat exchanger 5, such that the second expansion element 6.2 expands the coolant top low-pressure level, both into the high-pressure section 8.1 and into the heat exchanger 5, and thus there is substantially no heat input into the low-pressure section 8.2. But in the vehicle cooling system 1 according to FIG. 2, a controllable valve element A5 is disposed in a partial section 2.41 of the coolant circuit section 2.4, which fluidically connects the branching point 2.5 of the coolant circuit 2 with the first expansion element 6.1 and the third expansion element 6.3. Unlike FIG. 1, the second expansion element 6.2 is disposed in the heat pump pipe section 2.21 in the cooling system 1 according to FIG. 2.

In heat pump operation using the air heat pump, this valve element A5 is open, such that the coolant can be expanded into the high-pressure section 8.1 and the heat exchanger 5. If the third expansion element 6.3 is open at the same time as well, the water heat pump is implemented in addition. If only the water heat pump is to be activated by means of the chiller 10, the valve element A5 is closed to prevent coolant from flowing into the high-pressure section 8.1 and the heat exchanger 5.

In heat pump operation of the coolant circuit 2, the coolant in the two exemplary embodiments shown in FIGS. 1 and 2 is cooled by means of the coolant-cooling medium heat exchanger 7 operating at high-pressure level, and the heat transferred to the water as cooling medium is then supplied to the heating heat exchanger 7.1, with which the air supplied to the vehicle interior is heated directly.

Another coolant cooling process takes place in the exemplary embodiments shown in FIGS. 1 and 2 by means of the heating register 5.1 inside the AC device 1.1 disposed downstream of coolant-cooling medium heat exchanger 7 in the flow direction S of the coolant.

Another common feature of the coolant circuits 2 according to the FIGS. 1 and 2 is another heat pump pipe section 2.22, which in the flow direction S of the coolant comprises a valve element A4 configured as a stop valve and a check valve R4 and connects the coolant pipe section connecting the heat exchanger 5 with the other stop valve A2 to the coolant pipe section connecting the check valve R3 to the coolant collector 9. In an additional function, the section 2.22 can also function as a discharge pipe section specifically for exclusive heat pump operation via the coolant-cooling medium heat exchanger 10.

Finally, the coolant circuit 2 according to both FIG. 1 and FIG. 2 comprises a discharge pipe section 2.3, which can fluidically connect the heat pump pipe section 2.21 with the other heat pump pipe section 2.22 by a valve element A3 configured as a stop valve. On the upstream side of the other heat pump pipe section 2.22, the stop valve A3 is connected to the pipe section of the heat pump pipe section 2.22 connecting the stop valve A4 with the check valve R4, while on the downstream side it is connected to the pipe section of the heat pump pipe section 2.21 connecting the stop valve A1 with the heat register 5.1.

For operating the cooling system in the heat pump mode for heating the vehicle compartment, the stop valve A1 and A4 are opened and the stop valve A2 is closed, i.e. the heat pump pipe section 2.21 and the heat pump pipe section 2.22 are fluidically connected to the cooling circuit 2.1.

In the cooling system 1 according to FIG. 1, the coolant compressed to high-pressure by means of the coolant compressor 4 flows via the coolant-cooling medium heat exchanger 7 and the stop valve A1 into the heat pump pipe section 2.21. The coolant flows through the heat register 5.1, the check valve R1, and is expanded by the second expansion element 6.2 into the high-pressure section 8.1 of the internal heat exchanger 8 and into the heat exchanger 5 in its capacity as heat pump evaporator and absorbs the ambient heat as evaporation heat. Then, the gaseous coolant flows through an open stop valve A4 and the other heat pump pipe section 2.22 and is then returned via the coolant collector 9, the low-pressure section 8.2 of the internal heat exchanger 8 to the coolant compressor 4. Thus in a first stage, the heat of the ambient air of the vehicle is transferred together with the heat introduced by the compressor 4 by means of the coolant-cooling medium heat exchanger 7 and the coolant circuit 11 to the heating heat exchanger 7.1 and thus to the air supplied to the interior of the vehicle, after said supply air is preheated in a first stage by means of the heating register 5.1 or the coolant is further cooled, respectively. The first and third expansion elements 6.1 and 6.3 are blocked in this configuration of heat pump circuit 2.2.

Unlike the vehicle cooling system 1 according to FIG. 1, the coolant in the cooling system 1 configured for heat pump mode according to FIG. 2 flows directly from the heating register 5.1 into the second expansion element 6.2 and is expanded to low-pressure there via the opened valve element A5 into the high-pressure section 8.1 and the heat exchanger 5.

Thus in the cooling systems according to FIGS. 1 and 2, the heat of the ambient air of the vehicle is in a first stage transferred together with the heat introduced by the compressor 4 by means of the coolant-cooling medium heat exchanger 7 and the coolant circuit 11 to the heating heat exchanger 7.1 and thus to the air supplied to the interior of the vehicle, after said supply air is preheated in a first stage by means of the heating register 5.1 or the coolant is further cooled, respectively. The first and third expansion means 6.1 and 6.3 are blocked in this configuration of heat pump circuit 2.2.

The heat source 13 of the chiller 10 may also be used as heat source for the heat pump circuit 2.1. To this end, the third expansion element 6.3 in the cooling systems 1 according to FIGS. 1 and 2 is opened.

In the cooling system 1 according to FIG. 1, the heat pump circuit 2.1 is formed in this case by the following components: coolant compressor 4, coolant-cooling medium heat exchanger 7, heating register 5.1, check valve R1, third expansion element 6.3, coolant-cooling medium heat exchanger 10, check valve R2, coolant collector 9, and internal heat exchanger 8, wherein the coolant flows through these components in the order listed in the flow direction S. The stop valve A1 is open here, while the stop valve A2 and the first expansion element 6.1 are closed. Thus the electric components 13 are used as heat sources via the chiller 10. If the second expansion element 6.2 and the stop valve A4 are open due to the discharge of displaced coolant in the heat pump configuration variant, the ambient air is additionally used as a heat source. The two expansion elements 6.2 and 6.3 are then open. But if the second expansion element 6.2 is closed, only the water heat pump is implemented with the chiller 10.

In the cooling system according to FIG. 2, the heat pump circuit 2.1 is formed in this case by the following components: coolant compressor 4, coolant-cooling medium heat exchanger 7, heating register 5.1, second expansion element 6.2, third expansion element 6.3, coolant-cooling medium heat exchanger 10, check valve R2, coolant collector 9, and internal heat exchanger 8, wherein the coolant flows through these components in the order listed in the flow direction S. The stop valve A1 is open here, while the stop valve A2, the first expansion element 6.1, and the valve element A5 are closed. Thus only the water heat pump based on the chiller 10 is used for heating the vehicle compartment. If the valve element A5 is open as well, the ambient air is in addition used as heat source.

When using the chiller 10 of the cooling system 1 according to FIG. 2 to implement the water heat pump, the coolant can be expanded to low-pressure level in different ways by means of the two expansion element 6.2 and 6.3. If the valve element A5 is blocked, the pressure can be reduced with one of the two expansion element 6.2 or 6.3, wherein the other expansion element is fully open. It is also possible to perform a graduated pressure reduction with the two expansion element 6.2 and 6.3.

According to FIGS. 1 and 2, when switching from operating the coolant circuit 2 as heat pump circuit 2.2 to AC operation, the stop valves A1 and A4 are closed and the stop valve A2 is opened.

When the cooling system 1 according to FIG. 1 is in AC operation, the coolant, which is compressed to high-pressure level using the coolant compressor 4, flows in the flow direction S through the coolant-cooling medium heat exchanger 7, then through the open stop valve A2 with stop valve A1 closed, the heat exchanger 5 as gas cooler, the high-pressure section 8.1 of the internal heat exchanger 8, the second expansion element 6.2, which is fully opened to its maximum cross section, and then the coolant is expanded by means of the first expansion element 6.1 into the evaporator 3, where it absorbs heat from the supply air flow into the vehicle interior, before the vaporous coolant is then returned via the check valve R3, the coolant collector 9, and the low-pressure section 8.2 of the internal heat exchanger 8 to the coolant compressor 4. By means of the cooling circuit 2.1, the heat absorbed from the supply air flowing into the vehicle interior is transferred in a first step as condensation heat by means of the indirect heat exchanger 7 to the heating circuit 11, which itself can be expediently connected to an ambient heat exchanger to be able to dissipate excess heat into the environment before in a next step residual heat is released into the ambient air of the vehicle by means of the heat exchanger 5 in its function as condenser or gas cooler.

The stop valves A1 and A4 are closed in this configuration of cooling circuit 2.1 according to FIG. 1. The stop valve A3 remains open to transfer displaced coolant from the heat pump pipe section 2.21 into the active circuit 2.1. If in this Ac operation the cross section of the fully opened second expansion element 6.2 is too small, a bypass line circumventing said second expansion element 6.2 can be implemented by means of a check valve R5, as shown as an option in FIG. 1.

When the cooling system 1 according to FIG. 2 is in AC operation, the coolant, which is compressed to high-pressure level using the coolant compressor 4, flows in the flow direction S through the coolant-cooling medium heat exchanger 7, then through the open stop valve A2 with stop valve A1 closed, the heat exchanger 5 as gas cooler, the high-pressure section 8.1 of the internal heat exchanger 8, the open valve element A5, which inevitably must allow bidirectional flow (otherwise a check valve R5 must be provided parallel to the stop valve A5 like in FIG. 1), and then, with the second expansion element 6.2 closed, the coolant is expanded by means of the first expansion element 6.1 into the evaporator 3, where it absorbs heat from the supply air flow into the vehicle interior, before the vaporous coolant is then returned via the check valve R3, the coolant collector 9, and the low-pressure section 8.2 of the internal heat exchanger 8 to the coolant compressor 4. By means of this cooling circuit 2.1, the heat absorbed from the supply air flowing into the vehicle interior is transferred in a first step as condensation heat by means of the indirect heat exchanger 7 to the heating circuit 11, which itself can be expediently connected to an ambient heat exchanger to be able to dissipate excess heat into the environment before in a next step residual heat is released into the ambient air of the vehicle by means of the heat exchanger 5 in its function as gas cooler.

If during AC operation of the cooling systems 1 according to FIGS. 1 and 2 the third expansion element 6.3 is open as well, coolant is expanded into the chiller 10, absorbs exhaust heat of the heat source 13 as evaporation heat in the process and is likewise returned via the check valve R2, the coolant collector 9, and the internal heat exchanger 8 to the coolant compressor 4. Exhaust heat of the heat source 13 is also dissipated as condensation/cooling down heat by means of the heat exchanger 5 in its function as condenser or gas cooler into the ambient air of the vehicle.

This now ensures that the internal heat exchanger 8 fulfills its intended function for the cooling system mode only, regardless of the selected heat pump configuration of the cooling system. It is inactive in the heat pump mode according to FIGS. 1 and 2, i.e.
  medium is only flowing through the low-pressure section 8.2 if a heat pump function is performed by the chiller 10 only, while stagnant coolant is applied to the high-pressure section 8.1, and
  if a heat pump function (with or without water heat pump by means of the chiller 10) is performed using the condenser or gas cooler 5, coolant is actively flowing through both sections of the internal heat exchanger 8 but does not effect a significant heat transfer due to the resulting pressure and temperature levels.

The invention claimed is:

1. A cooling system of a vehicle having a primary coolant circuit which is operable as a cooling circuit for an AC operation and as a heat pump circuit for a heating operation, the cooling system comprising:
  an evaporator;
  a coolant compressor;
  a heat exchanger configured as a coolant condenser or a gas cooler for the cooling circuit or as a heat pump evaporator for the heat pump circuit;
  a first expansion valve corresponding to the evaporator;
  a second expansion valve corresponding to the heat exchanger; and
  an internal heat exchanger comprising a high-pressure section and a low-pressure section, wherein the coolant compressor is fluidically arranged immediately downstream of the low-pressure section and the high-pressure section is part of a coolant circuit section which connects the second expansion valve to the heat exchanger,
  wherein the primary coolant circuit comprises a coolant path, the coolant path beginning at an outlet of the coolant compressor, ending at an inlet of the coolant compressor, and following a flow direction of the primary coolant circuit,
  wherein, along the coolant path of the primary coolant circuit:
    the second expansion valve is fluidically arranged between the high-pressure section of the internal heat exchanger and a series connection of the evaporator and the first expansion valve; and
    the high-pressure section is fluidically arranged between the second expansion valve and the heat exchanger, and
  wherein, during the heating operation, the cooling system is configured to actively flow the high-pressure section of the internal heat exchanger and to control the second expansion valve to reduce a coolant pressure in the high-pressure section to that of the low-pressure section, thereby disabling the internal heat exchanger during the heating operation.

2. The cooling system according to claim 1, further comprising:
  a heat pump pipe section comprising a heat register,
  wherein the heat pump pipe section is separate from the primary coolant circuit and fluidically connectable to the high-pressure section of the internal heat exchanger through the second expansion valve, joining the primary coolant circuit at a junction at which both the second expansion valve and a series connection of the evaporator and the first expansion valve meet,
  wherein, by way of a first stop valve, the cooling system is configured to connect the heat pump pipe section to the primary coolant circuit for forming the heat pump circuit and to disconnect the heat pump pipe section from the primary coolant circuit for the AC operation,
  wherein a further heat pump pipe section comprising a fourth stop valve and a fourth check valve fluidically joins a pipe section comprising a second stop valve, which connects the heat exchanger to the compressor, to a pipe section connecting a third check valve downstream of the evaporator to the low-pressure section of the internal heat exchanger, and
  wherein a discharge pipe section comprising a third stop valve fluidically joins the further heat pump pipe section, at a junction between the fourth stop valve and the fourth check valve, to the heat pump pipe section.

3. The cooling system according to claim 1, wherein a check valve is connected in parallel with the second expansion valve and oriented so as to:
  bypass the second expansion valve or together with the second expansion valve pass flow during the AC operation, and
  block flow during the heating operation.

4. The cooling system according to claim 1, wherein a first coolant-cooling medium heat exchanger is provided along the primary coolant circuit, the first coolant-cooling medium heat exchanger comprising a secondary coolant circuit which is fluidically separate from the primary coolant circuit and which is connected to at least one electric component operated as a heat source,
a third expansion valve associated with the first coolant-cooling medium heat exchanger is provided along the primary coolant circuit, and
the series connection of the evaporator with the first expansion valve is fluidically connected in parallel with a series connection of the first coolant-cooling medium heat exchanger with the third expansion valve.

5. The cooling system according to claim 4, wherein the series connection of the first coolant-cooling medium heat exchanger with the third expansion valve is fluidically connectable to the high-pressure section of the internal heat exchanger through the second expansion valve.

6. The cooling system according to claim 1, further comprising a coolant collector which is arranged immediately upstream of the low-pressure section.

7. The cooling system according to claim 1, wherein, along the coolant path, a second coolant-cooling-medium heat exchanger is provided immediately downstream of the coolant compressor, the second coolant-cooling medium heat exchanger comprising a tertiary coolant circuit which is fluidically separate from the primary coolant circuit and which is fluidically connected to an additional heat exchanger arranged in an AC unit and to a coolant pump for circulating coolant through the tertiary coolant circuit.

8. The cooling system according to claim 7, wherein the evaporator and a heat register are arranged in the AC unit with the additional heat exchanger.

9. The cooling system according to claim 4, wherein, along the coolant path, a second coolant-cooling-medium heat exchanger is provided immediately downstream of the coolant compressor, the second coolant-cooling medium heat exchanger comprising a tertiary coolant circuit which is fluidically separate from the primary and secondary coolant circuits and which is fluidically connected to an additional heat exchanger arranged in an AC unit and a coolant pump for circulating coolant through the tertiary coolant circuit.

10. A cooling system of a vehicle having a primary coolant circuit which is operable as a cooling circuit for an AC operation and as a heat pump circuit for a heating operation, the cooling system comprising:
    an evaporator;
    a coolant compressor;
    a heat exchanger as a coolant condenser or a gas cooler for the cooling circuit or as a heat pump evaporator for the heat pump circuit;
    a first expansion valve corresponding to the evaporator;
    a second expansion valve corresponding to the heat exchanger; and
    an internal heat exchanger comprising a high-pressure section and a low-pressure section, wherein the coolant compressor is fluidically arranged immediately downstream of the low-pressure section and the high-pressure section is part of a coolant circuit section which connects the second expansion valve to the heat exchanger,
    wherein the primary coolant circuit comprises a coolant path, the coolant path beginning at an outlet of the coolant compressor, ending at an inlet of the coolant compressor, and following a flow direction of the primary coolant circuit,
    wherein, along the coolant path of the primary coolant circuit:
        a controllable valve is fluidically arranged between the high-pressure section of the internal heat exchanger and a junction at which both the second expansion valve and a series connection of the evaporator and the first expansion valve meet; and
        the high-pressure section is fluidically arranged between the controllable valve and the heat exchanger, and
    wherein, during the heating operation, the cooling system is configured to actively flow the high-pressure section of the internal heat exchanger and to control the second expansion valve and/or the controllable valve to reduce a coolant pressure in the high-pressure section to that of the low-pressure section, thereby disabling the internal heat exchanger during the heating operation.

11. The cooling system according to claim 10, further comprising:
    a heat pump pipe section having a heat register,
    wherein the heat pump pipe section is separate from the primary coolant circuit and fluidically connectable to the high-pressure section of the internal heat exchanger through the second expansion valve, joining the primary coolant circuit at the junction at which both the second expansion valve and a series connection of the evaporator and the first expansion valve meet,
    wherein, by way of a first stop valve, the cooling system is configured to connect the heat pump pipe section to the primary coolant circuit for forming the heat pump circuit and to disconnect the heat pump pipe section from the primary coolant circuit for the AC operation,
    wherein a further heat pump pipe section comprising a fourth stop valve and a fourth check valve fluidically joins a pipe section comprising a second stop valve, which connects the heat exchanger to the compressor, to a pipe section connecting a third check valve downstream of the evaporator to the low-pressure section of the internal heat exchanger, and
    wherein a discharge pipe section comprising a third stop valve fluidically joins the further heat pump pipe section, at a junction between the fourth stop valve and the fourth check valve, to the heat pump pipe section.

12. The cooling system according to claim 10, wherein a check valve is connected in parallel with the controllable valve and oriented so as to:
    bypass the controllable valve or together with the controllable valve pass flow during the AC operation, and
    block flow during the heating operation.

13. The cooling system according to claim 10, wherein a first coolant-cooling medium heat exchanger is provided along the primary coolant circuit, the first coolant-cooling medium heat exchanger comprising a secondary coolant circuit which is fluidically separate from the primary coolant circuit and which is connected to at least one electric component operated as a heat source,
a third expansion valve associated with the first coolant-cooling medium heat exchanger is provided along the primary coolant circuit, and
the series connection of the evaporator with the first expansion valve is fluidically connected in parallel with a series connection of the first coolant-cooling medium heat exchanger with the third expansion valve.

14. The cooling system according to claim 13, wherein the series connection of the first coolant-cooling medium heat exchanger with the third expansion valve is fluidically connectable to the high-pressure section of the internal heat exchanger through the controllable valve.

15. The cooling system according to claim 10, further comprising a coolant collector which is arranged immediately upstream of the low-pressure section.

16. The cooling system according to claim 10, wherein, along the coolant path, a second coolant-cooling medium heat exchanger is provided immediately downstream of the coolant compressor, the second coolant-cooling medium heat exchanger comprising a tertiary coolant circuit which is fluidically separate from the primary coolant circuit and which is fluidically connected to an additional heat exchanger arranged in an AC unit and a coolant pump for circulating coolant through the tertiary coolant circuit.

17. The cooling system according to claim 16, wherein the evaporator and a heat register are arranged in the AC unit with the additional heat exchanger.

18. The cooling system according to claim 13, wherein, along the coolant path, a second coolant-cooling medium heat exchanger is provided immediately downstream of the coolant compressor, the second coolant-cooling medium heat exchanger comprising a tertiary coolant circuit which is fluidically separate from the primary and secondary coolant circuits and which is fluidically connected to an additional heat exchanger arranged in an AC unit and a coolant pump for circulating coolant through the tertiary coolant circuit.

* * * * *